(12) United States Patent
Morabit

(10) Patent No.: US 12,219,896 B2
(45) Date of Patent: Feb. 11, 2025

(54) TRIMMER LINE BLADE

(71) Applicant: Aero-Flex Technologies, Inc., Rock Hill, SC (US)

(72) Inventor: Vincent D. Morabit, Rock Hill, SC (US)

(73) Assignee: AERO-FLEX TECHNOLOGIES, INC., Rock Hill, SC (US)

( * ) Notice: Subject to any disclaimer, the term of this patent is extended or adjusted under 35 U.S.C. 154(b) by 295 days.

(21) Appl. No.: 17/885,804

(22) Filed: Aug. 11, 2022

(65) Prior Publication Data

US 2022/0377975 A1 Dec. 1, 2022

Related U.S. Application Data

(63) Continuation-in-part of application No. 16/830,746, filed on Mar. 26, 2020, now Pat. No. 11,464,162.

(60) Provisional application No. 63/232,362, filed on Aug. 12, 2021, provisional application No. 62/825,237, filed on Mar. 28, 2019.

(51) Int. Cl.
    *A01D 34/73* (2006.01)
(52) U.S. Cl.
    CPC ................. *A01D 34/733* (2013.01)
(58) Field of Classification Search
    CPC ............ A01D 34/733; A01D 34/4168
    USPC .......................................... 30/276
    See application file for complete search history.

(56) References Cited

U.S. PATENT DOCUMENTS

| | | | |
|---|---|---|---|
| 4,126,991 A | 11/1978 | Gobin | |
| 4,165,597 A | 8/1979 | Scanland | |
| 5,761,816 A | 6/1998 | Morabit | |
| RE36,940 E | 11/2000 | Fogle | |
| 7,210,231 B2 | 5/2007 | Legrand | |
| 9,414,540 B2 | 8/2016 | Morabit | |
| 9,474,205 B2 | 10/2016 | Morabit | |
| 10,631,458 B2 | 4/2020 | Morabit | |
| 10,993,369 B2 * | 5/2021 | Skinner | A01D 34/53 |
| 11,464,162 B2 * | 10/2022 | Morabit | A01D 34/4166 |
| 2001/0003935 A1 | 6/2001 | Morabit | |
| 2005/0188544 A1 | 9/2005 | Legrand | |
| 2010/0101099 A1 | 4/2010 | Morabit | |
| 2012/0102762 A1 | 5/2012 | Cigarini | |
| 2012/0208021 A1 | 8/2012 | Yang | |
| 2016/0044864 A1 | 2/2016 | Hermann | |
| 2016/0143220 A1 | 5/2016 | Cild | |
| 2018/0184588 A1 | 7/2018 | Morabit | |
| 2020/0120864 A1 | 4/2020 | Morabit | |
| 2020/0281116 A1 | 9/2020 | Guo | |
| 2020/0305343 A1 | 10/2020 | Morabit | |
| 2020/0375100 A1 | 12/2020 | Skinner | |
| 2021/0092898 A1 | 4/2021 | Ishikawa | |

* cited by examiner

*Primary Examiner* — Omar Flores Sanchez
(74) *Attorney, Agent, or Firm* — NIXON & VANDERHYE P.C.

(57) ABSTRACT

A reversible line blade for a rotating trimmer includes a loading section configured to be securable for rotation with a head of the rotating trimmer, a living hinge extending from the loading section, a transition section extending from the living hinge, and a cutting segment extending from the transition section. At least one of the transition section and the cutting segment has a cross-sectional shape that is configured to generate an updraft when the line blade is rotated clockwise and when the line blade is rotated counterclockwise.

18 Claims, 6 Drawing Sheets

TRIMMER LINE BLADE

CROSS-REFERENCES TO RELATED APPLICATIONS

This application claims the benefit of U.S. Provisional Patent Application No. 63/232,362, filed Aug. 12, 2021, the entire content of which is herein incorporated by reference. This application is also a continuation-in-part of U.S. patent application Ser. No. 16/830,746, filed Mar. 26, 2020, which claims the benefit of U.S. Provisional Patent Application No. 62/825,237, filed Mar. 28, 2019, the entire contents of each of which are herein incorporated by reference.

STATEMENT REGARDING FEDERALLY SPONSORED RESEARCH OR DEVELOPMENT (Not Applicable)

BACKGROUND

The invention relates to line blades for a rotating trimmer and, more particularly, to a multi-zone line blade with improved aerodynamic, stability and cutting capabilities.

Monofilament line, commonly used with all battery trimmers and most gas trimmers, is inherently inefficient and weak due to (1) excessive power drag inefficiencies, (2) limited and poor cutting quality and performance due to its dullness and grass blowdown, while requiring higher speed cutting, (3) excessive wear and failure rates needing constant replenishment from unreliable bump systems, and (4) limited ability to cut bigger vegetation. Monofilament line is by nature over-stressed, and its complex and unreliable feeding systems are designed to compensate for these well-known and continuing monofilament line failures. Users are highly frustrated with monofilament line and feed (bump) systems because of their inherent respooling and jamming complexities.

Further disappointment results from the performance of cordless (battery-powered) trimmers, as grass cutting quantity and quality with monofilament line are inferior, and most often, do not meet job needs in cutting time due to limited battery life. Battery powered attempts do not have an adequate charge and do not run long enough to finish the workload. Further, battery life is limited, batteries are heavy creating user fatigue, and they are costly to replace.

The current state of the art for flexible line blades provides major reliability and cutting improvements over monofilament line, particularly regarding its better ability to cut at much lower speeds while being more adequately designed to withstand normally high impact forces without the harassing failures of monofilament lines. Further and more importantly, the line blade orientation can be pitched to create lift-induced updraft that assists with grass lift in the rotary mowing and/or the trimming process. While a major improvement in so many areas, there are numerous tradeoff problems with existing line blades associated with high drag, flapping, twist resonance, undesirable grass blowdown, and other adversities involving grass cutting characteristics.

Current line blade designs incorporate three basic segment/zones of different shapes and configurations, each serving individual operational performance and function. The blade segment may carry a sharp leading edge from the hinge to the cutting tip. This inherently produces a vulnerability to aerodynamic and aeroelastic forces that dramatically change how the blade interacts with related active forces, thus making it susceptible to instability. The three-segment line blades, such as the line blades available from Aero-Flex Technologies in Rock Hill, SC, are growing in acceptance and are beneficial for gas trimmers. The existing line blades, however, are not yet fully practical for cordless trimmers because adequate battery charge storage technology is currently limited, making such trimmers 'power starved,' and in order for the current line blades to cut with a leading sharper edge, which has been found desirable through testing and experimentation, an elevated drag further reduces battery life. While cutting on the blunt side of the aerodynamically-shaped cross-section flexible line blades is still superior to using a monofilament line, the added benefits of cutting with the sharper side of the cross-sectional shape are significant.

A four segment/zone blade is also described in the current assignee's U.S. patent application Ser. No. 16/830,746, which is incorporated by reference above.

Cordless trimmers are far from being competitive with gas trimmers. High energy concentration of gasoline in relatively large fuel tanks enables gas trimmers to run for long periods of time. As long as there is ample fuel available, gas trimmers are not subject to energy limitations, and refilling the fuel tank is a short process. On the other hand, cordless trimmer use time is capped due to the very limited supply of energy stored in batteries, which can take hours to recharge, effectively rendering the tool useless until recharged. While battery technology is improving, it falls far short of gasoline energy. For example, it takes at least ten (10) 120 watt-hour batteries to equate the energy in one pint of gasoline, generally about a tank in a gas trimmer. Therefore, so that user run time can be maximized, inefficient use of energy in cordless trimmers needs to be minimized, which includes the high drag penalties of cutting with conventional monofilament line or inefficient and unstable line blades. While cordless trimmers are an attraction over gas trimmers (no gas, no smoke, low noise, no cranking, etc.), current user dissatisfaction from poor performance from monofilament line further implies an inferior or lower value product to the user.

While the existing flexible line blades from Aero-Flex Technologies will improve trimming well beyond monofilament line, there still remains negatives to be resolved by the line blades of the described embodiments. There is a need to enable more cordless trimmer options toward better cutting rates, greater area cut per battery charge, and higher feed speed options for more aggressive trimming. There is also a need to create helpful updraft when rotating in both directions and the need to prevent grass blowdown, as an undesirable down draft may occur from a downward blade pitch when rotating in either direction.

Line blade flutter, a current disadvantage, is due to complex interaction of aerodynamic and torsional forces acting at different order harmonics. Flutter is a flapping of the blade better described as similar to a bird's wing flapping. It severely interferes with cutting vegetation, especially when assisted with a glider support disc during mowing with flexible line blades. Flutter also creates aggressive impact of the blades to the grass to prevent an even height or level cut. Flutter also creates unequal wear between the line blades, creating more vibratory effects on the trimmer head and on the user.

Added noise from sharp leading edges with existing line blades is generated from harmonic resonance conditions due to complex dynamic and interactive forces such as generated by turbulence, air bending forces, line blade structure, material torsional resistance, and centrifugal forces. These unstable harmonic twists are due to the complex interaction of aerodynamic and centrifugal forces further complicated by the line blade torsional response (like a torsional spring). This has been observed with a strobe light together with dynamometer testing, as well as a study of high speed camera viewing. Close examination shows that (but occurring less when cutting into vegetation) pitch angle cycles dynamically between positive and negative twisting due to complex differentiating operational forces on the blade further influenced by torsional cycling. These reactions increase drag and energy losses. When free spinning (but less occurring when into cutting into vegetation), these added dynamic deficiencies can create an undesirable and irritating noise at elevated pitch levels. Heavy amperage overloading can also occur to cause current 'spiking,' a premature circuit breaker overload activation shutting down motor operation. All these negatives severely hinder the current state of the art of line blade usage for cordless trimmers.

SUMMARY

The improvements to the flexible line blade cutting system offered with the line blades according to the described embodiments will make both gas and electric grass trimmers more useful, energy-efficient, and productive cutting performers characterized by improved lower cost economies, and better ergonomics during use all adding to greater value.

A triangular tip provides an updraft benefit that is important for conventional rotary mowing and trimming. Higher upward air flow is helpful to lift grass for a more 'supported' and cleaner cut. The flexible line blade with hinge and the triangular cross section within the cutting zone provide updraft air for lifting grass into or toward the cutting edge while in either rotational direction. In the opposite sense, the positioned lower face of the triangular section may prevent any downdraft or blowdown (when rotating in any direction) that will push grass downward and away from the cutters, thus preventing the grass from being cut as intended. The design prevents harmful downdraft from the cutting tip segment in both rotating directions. The blade is 'reversible' and designed to create a helpful updraft that lifts grass for a cleaner and more even cut height when rotating in either a clockwise (CW) or counterclockwise (CCW) rotational direction. The novel (oriented) triangle cross-section creates the benefit of updraft air in both CW and CCW rotational directions. No matter what direction of rotation, the upward air lifts, stiffens and supports grass upward as an additional aid for a clean and even cut. No matter what direction of rotation, downdraft or grass blowdown that hinders grass from being cut is prevented.

The cutting tip is properly and structurally oriented with stability by a vertical and flexible hinge and accompanying blade structure to maintain a desirable angle of attack in the cutting direction at the outer portion or the cutting zone/segment of the line blade, whether rotating clockwise or counterclockwise. The profile at the tip zone has at the lower side of the blade tip with a flat/neutral angle (horizontal with respect to the plane of rotation). The lower face of the triangular cutting tip runs generally parallel to the plane of rotation and does not generate significant airflow either upward or downward. The added mass of the triangular cross-section dramatically improves kinetic energy of the cutter compared to any current monofilament string sizes.

The leading cutting edges may have a radius of less than 0.03 inches (for example, 0.025 inches) for a sharper cutting edge compared to the smallest extruded trimmer line on the market. Therefore, the line blade of the described embodiments has a much sharper cutting edge that reduces cutting drag—an important benefit for battery trimmer drag reduction.

Dimples, preferably concave, may be placed symmetrically in dual alignment within the transition zone to do the following:
  Reduce annoying high pitch resonant noise
  Reduce weight for reducing cost
  Shaped with a concave golf ball curvature
  To reduce drag at the higher speeds
  Provide a unique appealing appearance In an exemplary embodiment, a reversible line blade for a rotating trimmer includes a loading section configured to be securable for rotation with a head of the rotating trimmer, a living hinge extending from the loading section, a transition section extending from the living hinge, and a cutting segment extending from the transition section. At least one of the transition section and the cutting segment has a cross-sectional shape that is configured to generate an updraft when the line blade is rotated clockwise and when the line blade is rotated counter-clockwise.

In some embodiments, at least the cutting segment has the cross-sectional shape that is configured to generate the updraft. The line blade may be rotatable in a cutting plane, and the cross-sectional shape may include a flat bottom that is parallel to the cutting plane. The cross-sectional shape may be generally triangular with matching leading edge and trailing edge geometries. The generally triangular shape may include the flat bottom and curved upper sides (or straight upper sides). In some embodiments, the cutting segment may include a leading cutting edge and a trailing cutting edge, and a radius of the leading and trailing cutting edges may be equal to or less than 0.025 inches.

The living hinge may include a height dimension in a plane perpendicular to the cutting plane that is larger than a width dimension in a plane that is parallel to the cutting plane.

The transition section may include dimples on an upper surface. The dimples may be concave dimples. The dimples may be oriented in two parallel rows along a length of the transition section, or may be extended to the cutting segment.

In another exemplary embodiment, a reversible line blade for a rotating trimmer includes a loading section configured to be securable for rotation with a head of the rotating trimmer, a living hinge extending from the loading section, and a cutting segment coupled with the living hinge that has a triangular cross-sectional shape.

BRIEF DESCRIPTION OF THE DRAWINGS

These and other aspects and advantages will be described in detail with reference to the accompanying drawings, in which.

DETAILED DESCRIPTION

Figure 1:
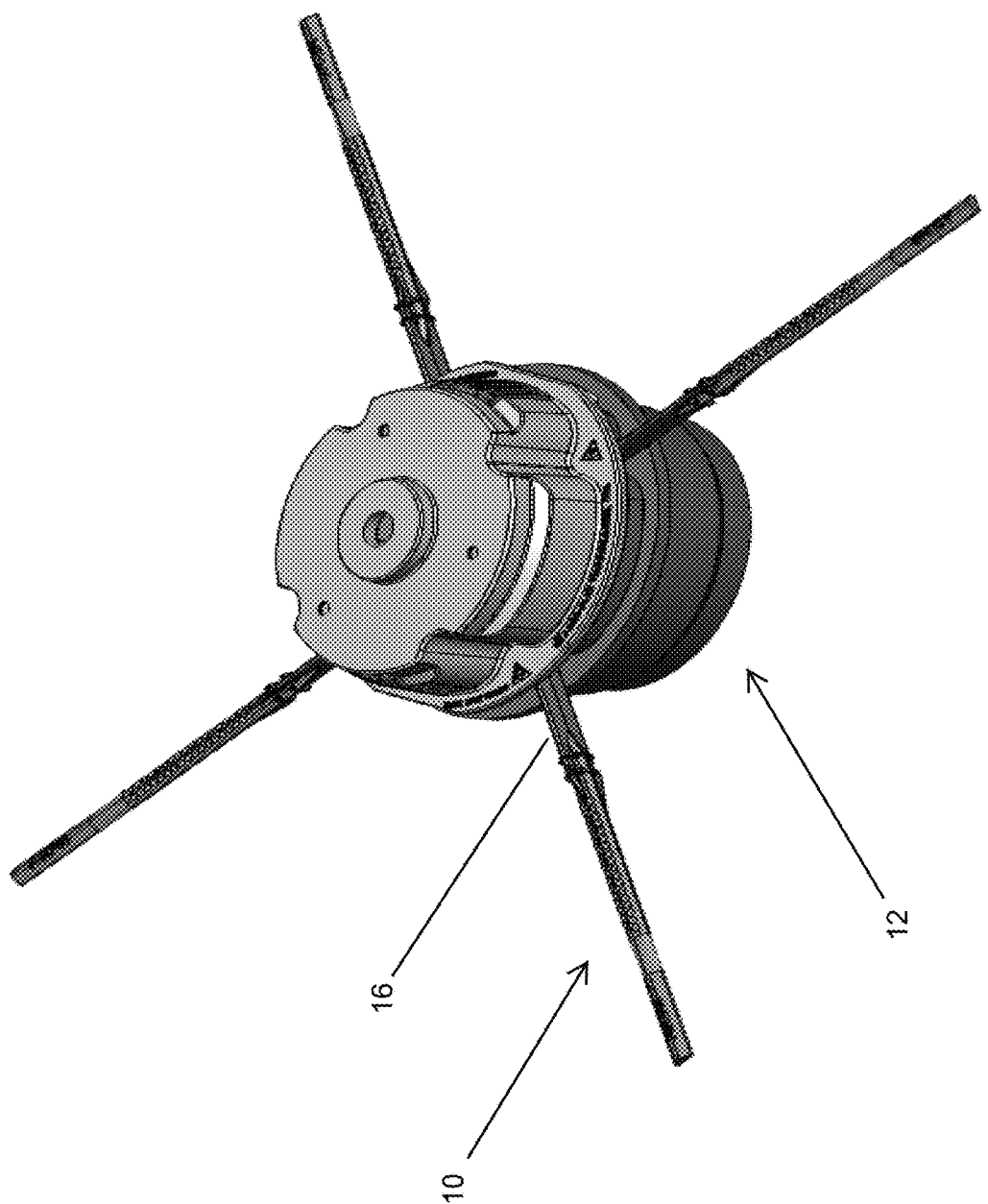
FIG. 1 shows the reversible line blades of the described embodiments supported on a rotating trimmer.

With reference to FIG. 1, a line blade 10 is securable in a cap 12 or the like for rotation on a cutting plane with a head of a rotating trimmer. The cap 12 may form part of the head or may be attachable to an existing trimmer head.

Figure 2:
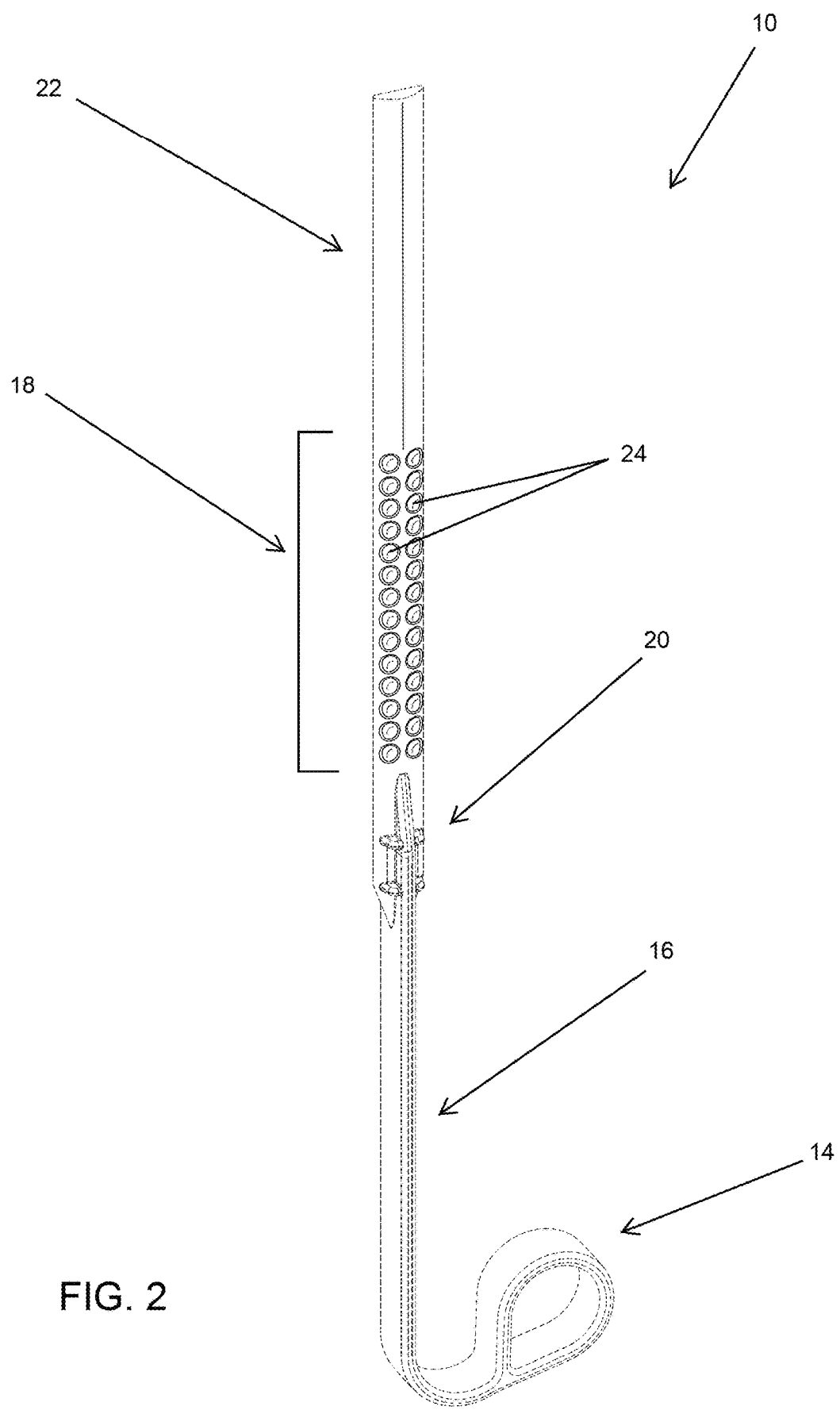
FIG. 2 is a perspective view of an exemplary line blade.
Figure 3:
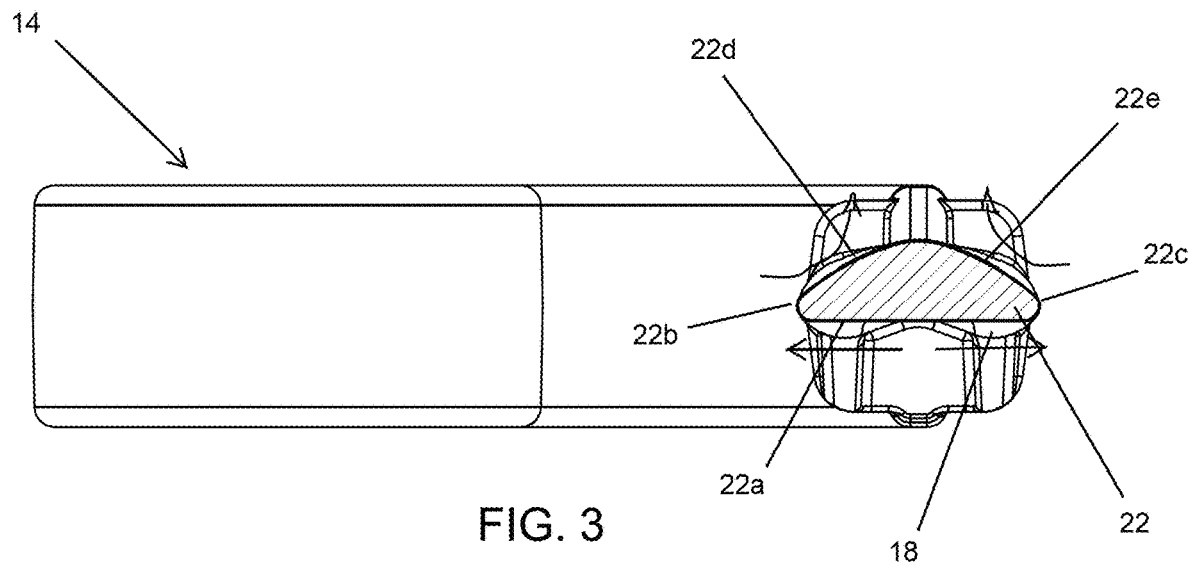
FIG. 3 is a sectional view of the line blade showing the cross-sectional shape of the cutting segment.

FIGS. 2 and 3 show the reversible line blade 10 according to the described embodiments. The line blade 10 includes a loading section 14 that is securable to the head or cap 12 of the rotating trimmer. The loading section 14 may comprise any suitable construction for connecting the blade 10 to the cap/head 12. An exemplary structure is described in U.S. Pat. No. 9,474,205, the contents of which are hereby incorporated by reference.

The reversible line blade 10 includes a living hinge 16 extending from the loading section 14. The living hinge 16 is flexible to accommodate operating parameters of the line blade 10 and rotating head 12. The amount of flex in the flexible living hinge 16 is variable according to many factors, including, for example, swath diameter, hinge thickness, hinge length, material flex modulus, blade mass, tip speed, centrifugal forces, rotational inertia and more. As shown in FIG. 1, the living hinge 16 exits the cap 12 in a generally upright orientation. That is, relative to the cutting plane (i.e., the plane defined by the rotating line blades), a height of the living hinge 16 is greater than its width or thickness. As such, the upright orientation of the living hinge 16 is detrimental to air and grass drag during use, and a length of the living hinge 16 may thus be minimized to minimize drag during use.

A transition section 18 extends from the living hinge 16. Structural and supporting ridges/ribs 20 in the area between the living hinge 16 and the transition section 18 are formed in a mold during the manufacturing process to maintain the essentially 90° turn in orientation between the living hinge 16 and the transition section 18. The cross-sectional shape of the transition section 18 may be essentially U-shaped, defining a central U-shaped channel along a length of the transition section 18. See, for example, FIG. 3.

The transition section 18 may be constructed in the same manner as that described in the above-referenced U.S. patent application Ser. No. 16/830,746. In some embodiments, the transition section 18 is constructed by combining opposite-facing teardrop-shaped sections at a specified preferred angle. The sections are combined to define a cross-sectional shape including the U-shaped channel on an opposite side of the U-shaped channel.

Figure 4:
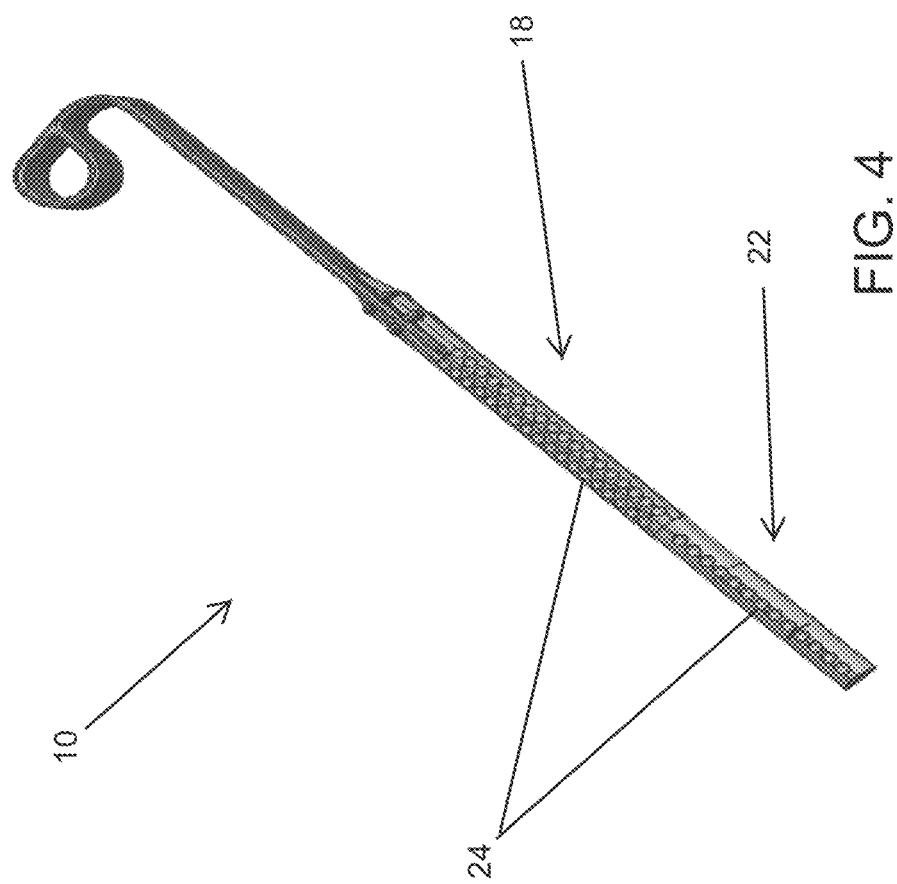
FIG. 4 shows a modified blade with dimples extending into the cutting segment.

The transition section 18 may be provided with dimples 24. The dimples 24 may be recessed or raised in varying depths. The dimples 24 may be round, hexagonal, elliptical or any other suitable shape. The dimples 24 are shown symmetrically positioned in a dual straight alignment with the transition section 18 on the top of the blade 10 (or can be placed beyond the transition section into the cutting segment 22 as shown in FIG. 4). The dimples 24 also add an inherently more desirable look that alerts a user to an aerodynamic and more high-tech visual benefit. Additionally, the dimples 24 achieve benefits that influence blade flight as well as noise reduction.

The cutting segment 22 extends from the transition section 18. Like the transition section 18, the cutting segment 22 has a cross-sectional shape that is configured to generate an updraft when the line blade is rotated, regardless of direction. With reference to FIG. 3, the cross-sectional shape of the cutting segment 22 may include a flat bottom 22A that is parallel to the cutting plane in which the line blade 10 is rotatable. In some embodiments, the cross-sectional shape of the cutting segment 22 is generally triangular with matching leading edge and trailing edge geometries. The term "generally triangular" refers essentially to a triangular shape that may include rounded apices 22B, 22C and/or curved upper sides 22D, 22E. The apices 22B, 22C define a leading cutting edge and a trailing cutting edge, depending on a direction of rotation. In some embodiments, a radius of the leading and trailing cutting edges is equal to or less than 0.025 inches.

In the event of impact with a sharp obstacle, e.g. a fence post, yard stake or the like, if the flat bottom and/or cutting edge of the line blade is somehow distorted, the line blade can be "sharpened" by running the trimmer with the blade flat or slightly angled against a concrete or other hard surface. The flat bottom of the cutting segment cross section enables this functionality. Alternatively, the affected line blade can be readily replaced in the field.

Figure 5:
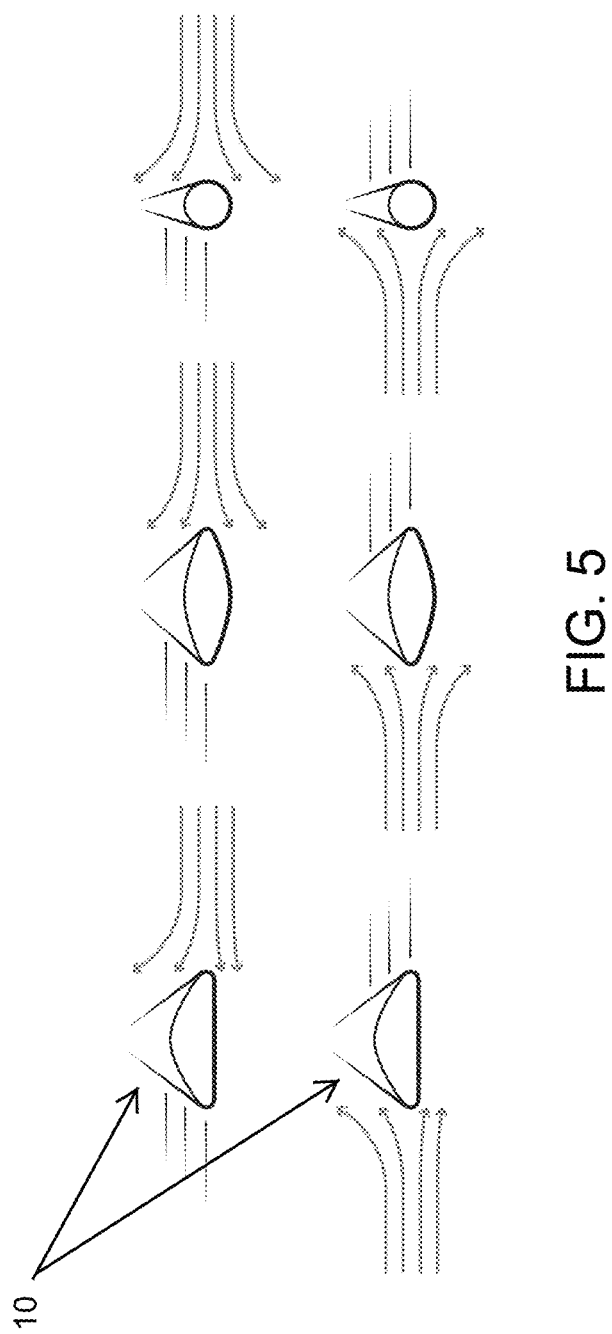
FIG. 5 shows airflow variations with different blade cross sections.
Figure 6:
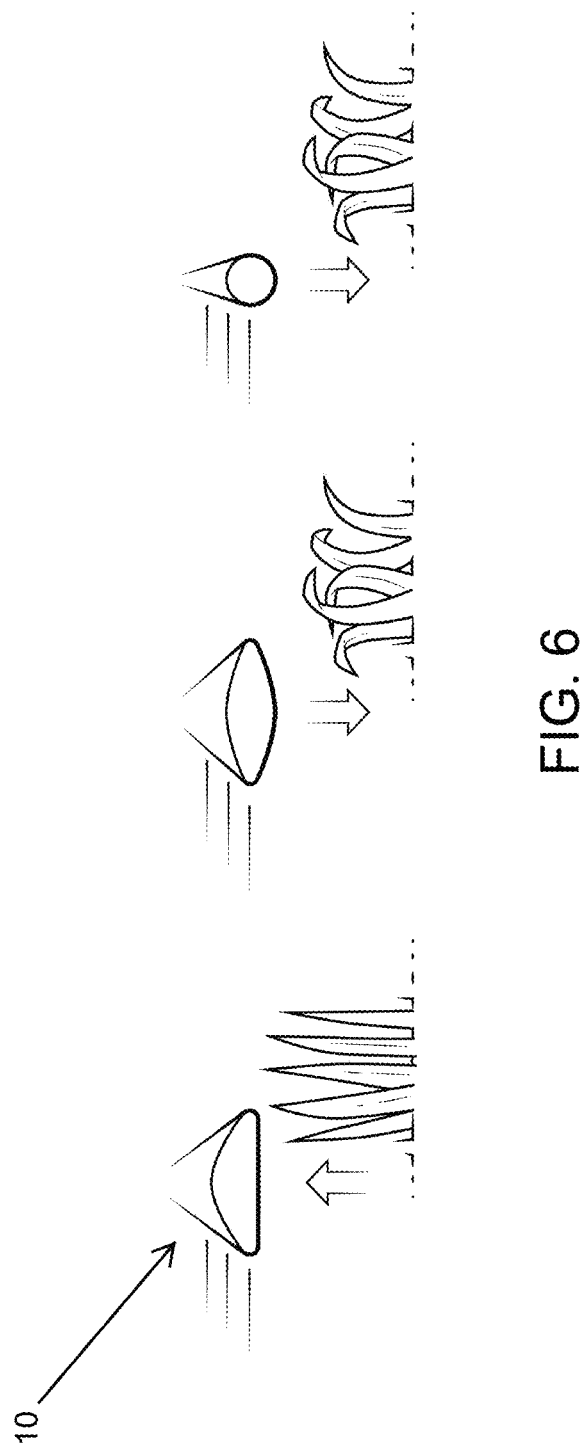
FIG. 6 shows the effect of different cutting segment cross-sections on grass being trimmed.

FIG. 5 shows the effect on airflow of the cross-sectional shape of the cutting segment 22. As shown, the flat bottom of the cross-section has a neutral effect on airflow, whereas the overall triangular shape causes an updraft regardless of a direction of rotation. FIG. 5 shows a comparison with blades having a different cross-section and/or on a filament line including an elliptical or symmetrical (round, hexagonal, twisted, square, etc.) shape, which affects a downdraft component of airflow during use. In practice, with reference to FIG. 6, the constant updraft via the triangular cross-section of the described line blade 10 serves to lift grass upward into the cutters, enabling better grass cutting. The downdraft effects of alternative-shaped blades/lines that tend to blow air down and push grass away can be avoided.

The triangular section of the described embodiments with a generally flatter section on the underside of the cutting tip while the upper section is slanted on both sides enables the blade to pump air upward when rotating in either direction.

The triangular segment can be symmetrical or asymmetrical, for example if there is a need to provide more favorable leading cutting edges for different type grass when the trimmers that may have reversible rotational features, or perhaps to favor different trimmer features into different types of vegetation to be cut. The sharper leading cutting edges at the base of the triangle (both CW and CCW) may have a tip radius of 0.025" or less for needed sharpness or other dynamic trade-offs. The symmetrical or potentially asymmetrical triangular section has favorable options for different sharper leading edges, and the addition of different mass options required for specialized grass cutting differences. The variation in leading edge sharpness and/or increased mass can enable efficient or more effective cutting through heavier vegetation, requiring less input force, thus enabling more effective grass cutting with less input energy required. The design also enables superior cutting at further reduced tip speed, thus further reducing air and blade frictional contact drag. The upper triangular segment also provides helpful options of adding more mass to more effectively increase kinetic energy while providing a much better blade-like structure.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A reversible line blade for a rotating trimmer, the reversible line blade comprising:
   a loading section configured to be securable for rotation with a head of the rotating trimmer;
   a living hinge extending from the loading section;
   a transition section extending from the living hinge; and
   a cutting segment extending from the transition section,
   wherein at least one of the transition section and the cutting segment has a cross-sectional shape that is configured to generate an updraft when the line blade is rotated clockwise and when the line blade is rotated counter-clockwise.

2. A reversible line blade according to claim 1, wherein at least the cutting segment has the cross-sectional shape that is configured to generate the updraft.

3. A reversible line blade according to claim 2, wherein the line blade is rotatable in a cutting plane, and wherein the cross-sectional shape comprises a flat bottom that is parallel to the cutting plane.

4. A reversible line blade according to claim 3, wherein the cross-sectional shape is generally triangular with matching leading edge and trailing edge geometries.

5. A reversible line blade according to claim 4, wherein the generally triangular shape includes the flat bottom and curved upper sides.

6. A reversible line blade according to claim 4, wherein the cutting segment comprises a leading cutting edge and a trailing cutting edge, and wherein a radius of the leading and trailing cutting edges is equal to or less than 0.025 inches.

7. A reversible line blade according to claim 1, wherein the cutting segment comprises a leading cutting edge and a trailing cutting edge, and wherein a radius of the leading and trailing cutting edges is equal to or less than 0.025 inches.

8. A reversible line blade according to claim 1, wherein the line blade is rotatable in a cutting plane, and wherein the cross-sectional shape comprises a flat bottom that is parallel to the cutting plane.

9. A reversible line blade according to claim 8, wherein the cross-sectional shape is generally triangular with matching leading edge and trailing edge geometries.

10. A reversible line blade according to claim 1, wherein the line blade is rotatable in a cutting plane, and wherein the living hinge comprises a height dimension in a plane perpendicular to the cutting plane that is larger than a width dimension in a plane that is parallel to the cutting plane.

11. A reversible line blade according to claim 1, wherein the transition section comprises dimples on an upper surface.

12. A reversible line blade according to claim 11, wherein the dimples are concave dimples.

13. A reversible line blade according to claim 11, wherein the dimples are oriented in two parallel rows along a length of the transition section.

14. A reversible line blade for a rotating trimmer, the reversible line blade comprising:
   a loading section configured to be securable for rotation with a head of the rotating trimmer;
   a living hinge extending from the loading section; and
   a cutting segment coupled with the living hinge, wherein the cutting segment has a triangular cross-sectional shape.

15. A reversible line blade according to claim 14, wherein the triangular cross-sectional shape is configured to generate an updraft when the line blade is rotated clockwise and when the line blade is rotated counter-clockwise.

16. A reversible line blade according to claim 14, wherein the line blade is rotatable in a cutting plane, and wherein the triangular cross-sectional shape comprises a flat bottom that is parallel to the cutting plane.

17. A reversible line blade according to claim 16, wherein the triangular cross-sectional shape comprises matching leading edge and trailing edge geometries.

18. A reversible line blade according to claim 14, wherein the cutting segment comprises a leading cutting edge and a trailing cutting edge, and wherein a radius of the leading and trailing cutting edges is equal to or less than 0.025 inches.

\* \* \* \* \*